US008148855B2

(12) United States Patent
Imperial

(10) Patent No.: US 8,148,855 B2
(45) Date of Patent: Apr. 3, 2012

(54) PORTABLE POWER SUPPLY SYSTEM

(75) Inventor: Anthony Imperial, San Francisco, CA (US)

(73) Assignee: NextArts, San Francisco, CA (US)

(*) Notice: Subject to any disclaimer, the term of this patent is extended or adjusted under 35 U.S.C. 154(b) by 302 days.

(21) Appl. No.: 12/540,292

(22) Filed: Aug. 12, 2009

(65) Prior Publication Data

US 2010/0038974 A1 Feb. 18, 2010

Related U.S. Application Data

(60) Provisional application No. 61/196,697, filed on Aug. 15, 2008.

(51) Int. Cl.
*H02J 7/00* (2006.01)
(52) U.S. Cl. .......................... 307/150; 307/65
(58) Field of Classification Search ................. 307/150, 307/65; 308/65
See application file for complete search history.

(56) References Cited

U.S. PATENT DOCUMENTS

| 4,300,087 A | * | 11/1981 | Meisner | 320/112 |
| 5,111,127 A | * | 5/1992 | Johnson | 320/101 |
| 5,689,412 A | * | 11/1997 | Chen | 363/125 |

OTHER PUBLICATIONS

XPower by Xantrex, Owners Guide, "XPower 1500 Portable Household Power", pp. 1-43, Oct. 2007.

* cited by examiner

*Primary Examiner* — Fritz M Fleming
(74) *Attorney, Agent, or Firm* — Perkins Coie LLP

(57) ABSTRACT

A method and apparatus for supplying cordless power to a remotely-located load device. A first power supply unit of a portable power supply system is configured to operate in a charge receive mode and/or a charge supply mode. When the first power supply unit is in the charge receive mode, a first energy storage device of the first power supply unit is configured to receive electrical energy via a first switch from one of a second power supply unit or an external power source. When the first power supply unit is in the charge supply mode, the first energy storage device of the first power supply unit is configured to supply electrical energy via a second switch to one of a third power supply unit or a remotely-located load device.

6 Claims, 6 Drawing Sheets

PORTABLE POWER SUPPLY SYSTEM

CROSS-REFERENCE TO RELATED APPLICATION

This application claims priority to U.S. Provisional Patent Application No. 61/196,697, filed Aug. 15, 2008, and entitled "Portable AC Power System for Theatrical, Audio-Visual and Industrial Applications" which is incorporated herein by reference.

FIELD OF THE INVENTION

At least one embodiment of the present invention pertains to cordless power supply systems, and more particularly, to portable power supply units configurable in a daisy chain for providing cordless electrical power to remotely-located load devices.

BACKGROUND

Industrial devices at times require electrical power to function, but may be situated a distance away from a convenient power source. A traveling theatrical production, for example, may employ the use of industrial equipment for audio-visual purposes, but may often find itself too remote for convenient access to a power source. Needs for a power source may similarly arise at other remote locations such as major special events, concerts, or constructions sites.

AC power generators are conventionally used to deliver power to remotely-located devices. Though useful to deliver temporary power, power generators can be very noisy. Noise produced by power generators is primarily comprised of engine noise and exhaust noise, and can easily exceed 100 decibels. The noise problem is further exacerbated when more than one power generator is needed. The more generators in operation at one time, the louder the noise level.

Power generators can also be hazardous to users. Typical power generator hazards include carbon monoxide (CO) poisoning, electric shock, and burns caused by fire. Power generators can produce high levels of carbon monoxide within minutes, particularly if used in a confined space. Furthermore, the use of power generator fuels, such as gasoline, propane, and kerosene, negatively impact the environment by contributing to the greenhouse effect.

As an alternative to the use of power generators, long power cables may also be used to power remotely-located devices. But long power cables present a risk to attendees who often must traverse the electrical wiring or cable runs.

DETAILED DESCRIPTION

The techniques introduced here enable the delivery of power to remotely-located devices without the loud noise of power generators or the hazard of long power cable runs. A portable power supply system that provides cordless power to remotely-located devices is disclosed. The portable power supply system includes a power supply unit with an energy storage device that can be charged by an external power source. Once fully charged, the portable power supply system can be transported to remote locations for delivery of cordless power to remotely-located load devices. The portable power supply system can be equipped with handles and/or casters to facilitate its transport.

The power supply unit of a portable power supply system can selectively operate in a charge receive mode and/or a charge supply mode. A solar panel, for example, can be connected to the portable power supply system to charge the system while simultaneously supplying power to a remotely-located load device. This technique enables the portable power supply system to supply power to a remotely-located load device for extended periods.

A plurality of power supply units of a portable power supply system can be connected in a daisy chain to deliver power to a remotely-located load device. A first power supply unit of a portable power supply system can receive charge from a second power supply unit, and the first power supply unit can supply charge to a third power supply unit. This technique enables the portable power supply system to supply power to remotely-located devices for extended periods.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
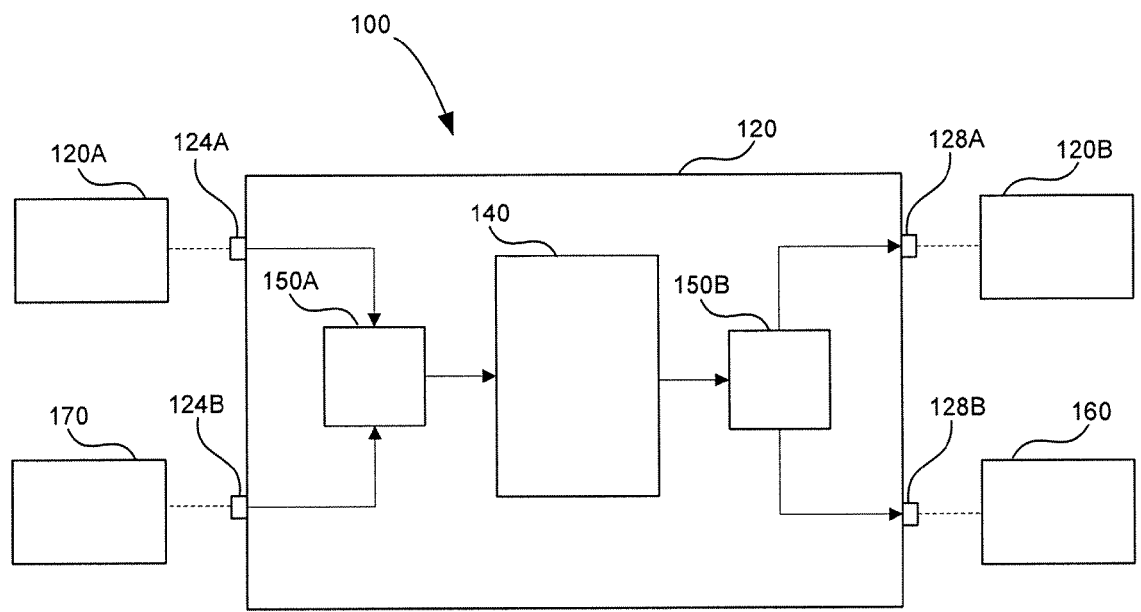
FIG. 1 depicts a power supply unit of an exemplary portable power supply system for delivering electrical energy to a remotely-located load device.

FIG. 1 shows an exemplary portable power supply system 100 for delivering cordless power to a remotely-located device 160. In one embodiment, the exemplary portable power supply system 100 includes a power supply unit 120 for delivering electrical energy to the remotely-located load device 160. Power supply unit 120 includes an energy storage device 140 and switching mechanisms 150A and 150B. Energy storage device 140 is configured to store electrical energy. Switching mechanism 150A is configured to direct electrical energy from either an input source 124A or an input source 124B to the energy storage device 140. Switching mechanism 150B is configured to direct electrical energy from the energy storage device 140 to either output destination 128A or output destination 128B. The energy storage device 140 can be a battery, such as a liquid battery or a lithium-ion battery, for example, but can alternatively be other types of energy storage devices, such as a fuel cell, a capacitor, etc. Switching mechanisms 150A and 150B can be interlock switches, for example, but can alternatively be other types of electrical switching devices, such as a switching relay, a solenoid switch, etc.

For purposes of these illustrations, a charge supply mode is meant to describe the outflow of electrical energy from an energy storage device to output destinations. A charge receive mode is meant to describe the inflow of electrical energy from input sources to an energy storage device. In FIG. 1, for example, a power supply unit 120 that is in a charge supply mode will have electrical energy directed from the energy storage device 140, via switching mechanism 150B, to either output destination 128A or output destination 128B. In a charge receive mode, the power supply unit 120 will have electrical energy directed from either input source 124A or input source 124B, via switching mechanism 150A, to the energy storage device 140.

In some embodiments, the power supply unit 120 of the exemplary power supply system 100 can be connected to external devices. In FIG. 1, for example, input source 124A is configured to receive electrical energy from a second power supply unit 120A that may be connected via daisy chain. Input source 124B is configured to receive electrical energy from an external power source 170. The external power source 170 can be a charger, for example, that receives alternating current (AC) electrical energy from any power grid AC source. Alternatively, other types of charging mechanisms can be used as an external power source, such as a portable solar panel that converts solar energy to electrical energy. As is further shown in FIG. 1, output destination 128A is configured to be connected to a third power supply unit 120B via daisy chain. Output destination 128B is configured to be connected to a remotely-located load device 160.

In some embodiments, switching mechanisms 150A and 150B are configured to rest in a default position when there are no external devices connected. In FIG. 1, for example, switching mechanism 150A rests in a default position such that electrical continuity is provided between input source 124B and energy storage device 140. But when the second power supply unit 120A is connected to input source 124A, the switching mechanism 150A will respond by switching to provide electrical continuity between input source 124A and the energy storage device 140. Similarly, switching mechanism 150B rests in a default position such that electrical continuity is provided between the energy storage device 140 and output destination 128B. But when a third power supply unit 120B is connected to output destination 128A, the switching mechanism 150B will respond by switching to provide electrical continuity between the energy storage device 140 and output destination 128A. A mechanical or electrical presence sensor may be used to detect the connection of an external device.

Figure 2A:
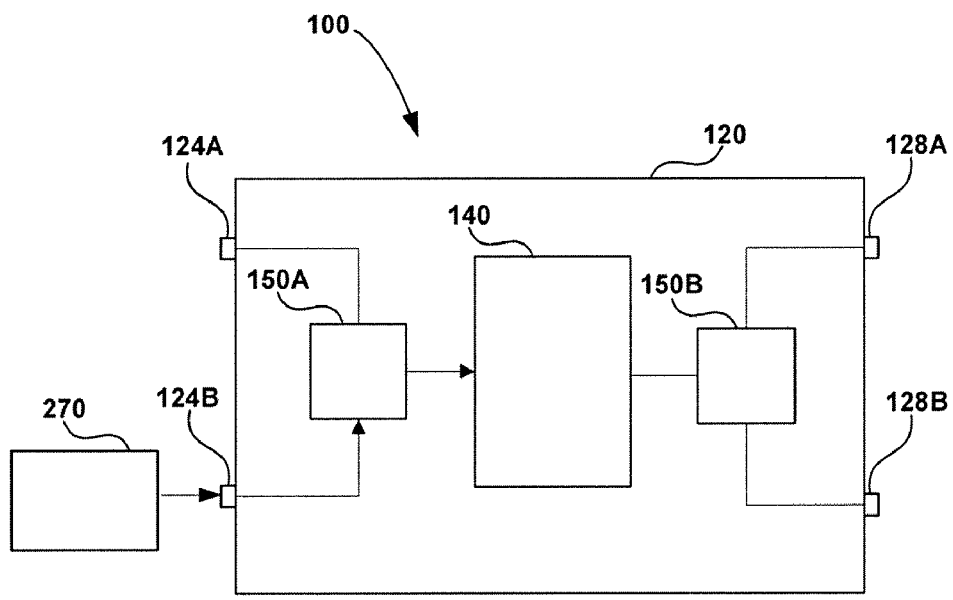
FIGS. 2A-2B depict alternative methods for charging a power supply unit of an exemplary portable power supply system.

Power supply units may occasionally require recharging as their energy storage levels drain. FIG. 2A depicts a power supply unit 120 of an exemplary portable power supply system 100 receiving charge at a charging station 270. The charging station 270 can be, for example, any power grid AC source. Electrical energy is directed from the charging station 270, via input source 124B and switching mechanism 150A, to energy storage device 140. In this case, power supply unit 120 is in a charge receive mode.

Figure 2B:
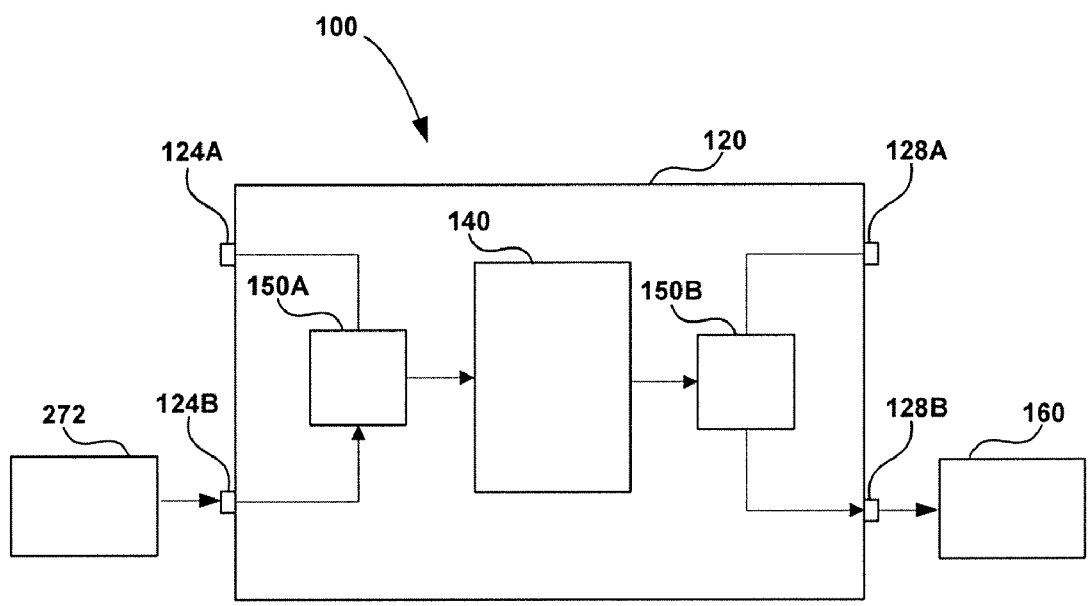

Alternatively, power supply units may receive a charging energy while delivering power to a remotely-located load device. FIG. 2B shows a portable charging device 272 connected to power supply unit 120 at input source 124B. The portable charging device 272 can be a solar panel, for example, that converts solar energy to electrical energy. A remotely-located load device 160 is connected to power supply unit 120 at output destination 128B. This technique enables power supply unit 120 to deliver power to remotely-located load device 160 while receiving a charging electrical energy. Power supply unit 120, in this case, is in a charge receive mode and a charge supply mode.

Figure 3:
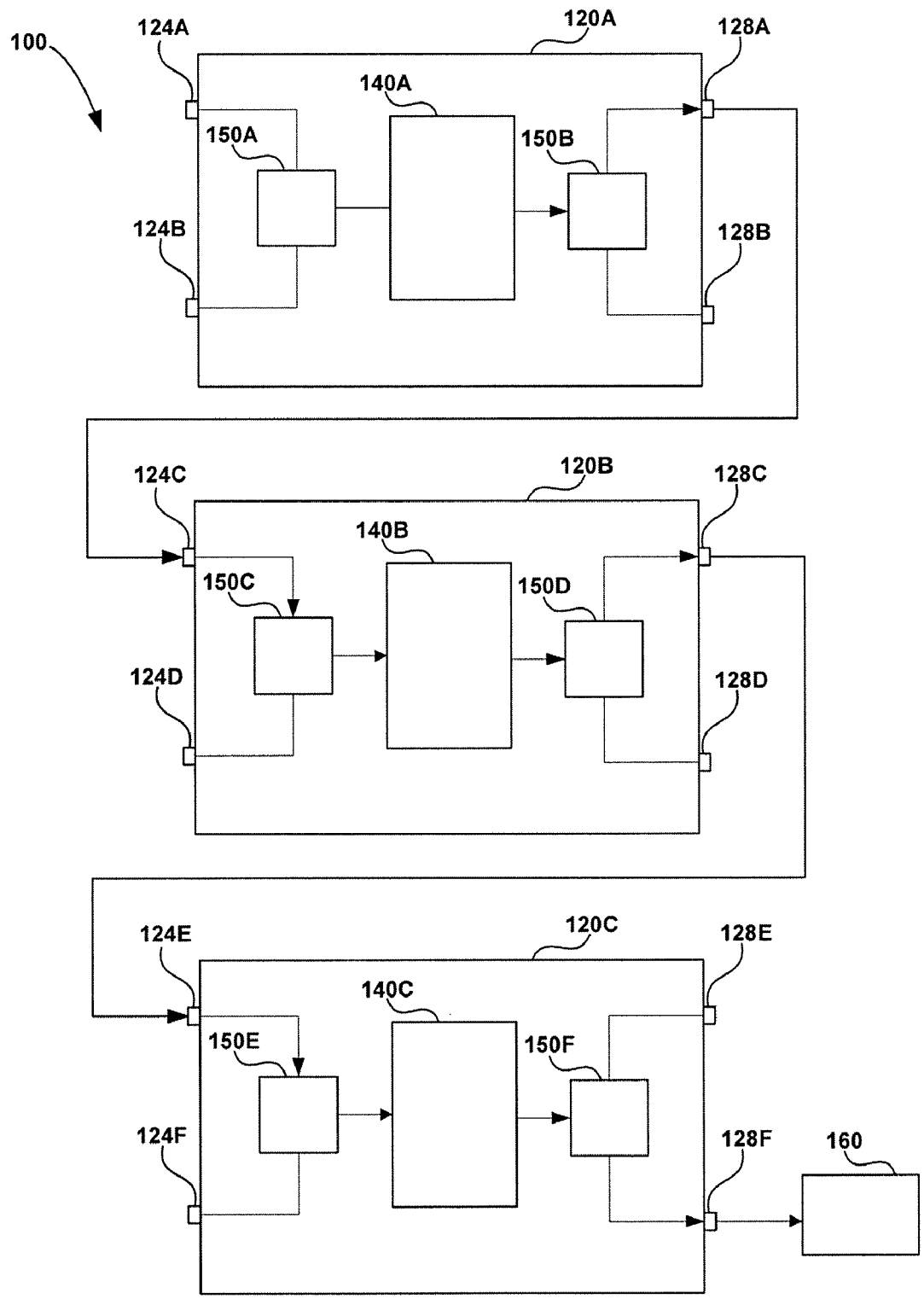
FIG. 3 depicts a plurality of power supply units of an exemplary portable power supply system interconnected via a daisy chain.

In some embodiments, the portable power supply system may include a plurality of power supply units. FIG. 3 shows an example of a portable power supply system 100 that includes a plurality of power supply units 120A, 120B, and 120C, interconnected via daisy chain. Power supply unit 120A includes energy storage device 140A, switching mechanism 150A, and switching mechanism 150B. Power supply unit 120B includes energy storage device 140B, switching mechanism 150C, and switching mechanism 150D. Power supply unit 120C includes energy storage device 140C, switching mechanism 150E, and switching mechanism 150F. Power supply unit 120A is connected to power supply unit 120B via output destination 128A and input source 124C. Power supply unit 120B is connected to power supply unit 120C via output destination 128C and input source 124E. Power supply unit 120C is connected to remotely-located load device 160 via output destination 128F.

Power supply unit 120A is in a charge supply mode and detects a connection at output destination 128A. Switching mechanism 150B responds by providing electrical continuity between energy storage device 140A and output destination 128A. Electrical energy is therefore directed to flow from energy storage device 140A to output destination 128A. The delivery of electrical energy to output destination 128A thus delivers a charging energy to input source 124C of power supply unit 120B.

Power supply unit 120B is in a charge receive mode and a charge supply mode. In charge receive mode, power supply unit 120B detects a connection at input source 124C. Switching mechanism 150C responds by providing electrical continuity between input source 124C and energy storage device 140B. A charging energy is therefore directed to flow from input source 124C to energy storage device 140B. In charge supply mode, power supply unit 120B detects a connection at output destination 128C. Switching mechanism 150D responds by providing electrical continuity between energy storage device 140B and output destination 128C. Electrical energy is therefore directed to flow from energy storage device 140B to output destination 128C. The delivery of electrical energy to output destination 128C thus delivers a charging energy to input source 124E of power supply unit 120C.

Power supply unit 120C is in a charge receive mode and a charge supply mode. In charge receive mode, power supply unit 120C detects a connection at input source 124E. Switching mechanism 150E responds by providing electrical continuity between input source 124E and energy storage device 140C. A charging energy is therefore directed to flow from input source 124E to energy storage device 140C. In charge supply mode, switching mechanism 150F detects no connection at output destination 128E. Switching mechanism 150F responds by providing electrical continuity between energy storage device 140C and output destination 128F. Electrical energy is therefore directed to flow from energy storage device 140C to output destination 128F. The delivery of electrical energy to output destination 128F thus delivers power to remotely-located load device 160.

Figure 4A:
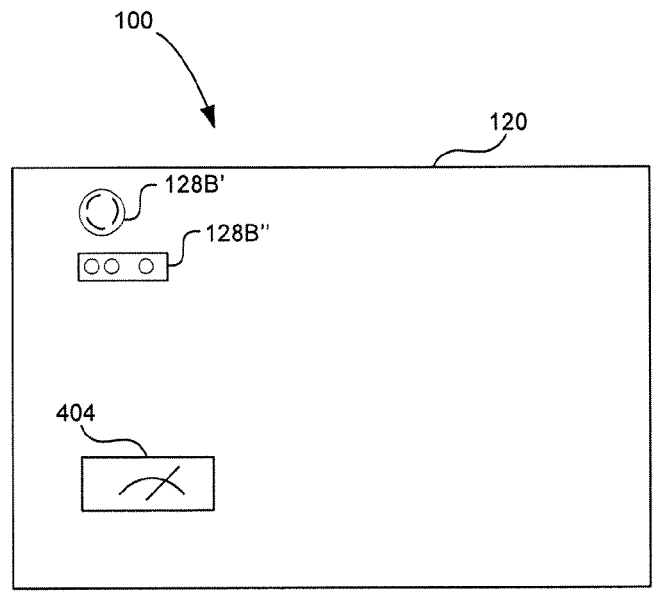
FIGS. 4A-4B depict exterior views of a power supply unit of an exemplary portable power supply system.

In some embodiments, a portable power supply system may be expected to power a variety of load devices with different types of input connectors. A power supply unit can, therefore, be customized to accommodate any number of power connectors. FIG. 4A, for example, shows a power supply unit 120 of a portable power supply system 100 with an L5-20 twist lock connector 128B' and a stagepin connector 128B". The power supply unit 120 may, however, be outfitted with any output power connector as needed. FIG. 4A further shows a charge indicator 404 that can be used to indicate the amount of electrical energy stored in a power supply unit's energy storage device.

Figure 4B:
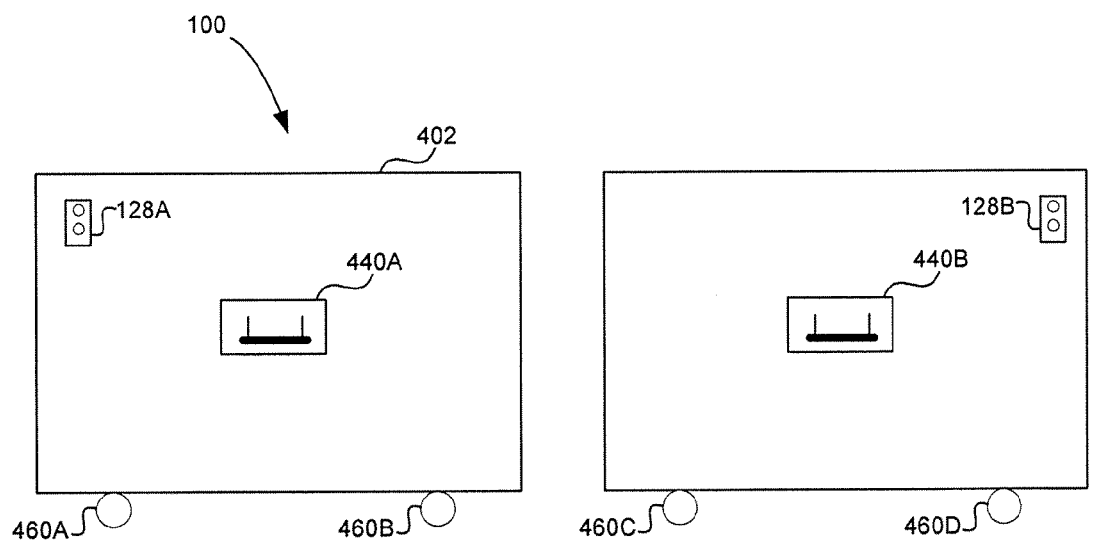

An exemplary power supply system may include mechanical features to facilitate portability. FIG. 4B, for example, shows a power supply system 120 enclosed in a housing mechanism 402, such as a chassis or a road case. The housing mechanism 402 can further include handles 440A and 440B for lifting, or casters 460A-D for rolling along a surface.

Figure 5:
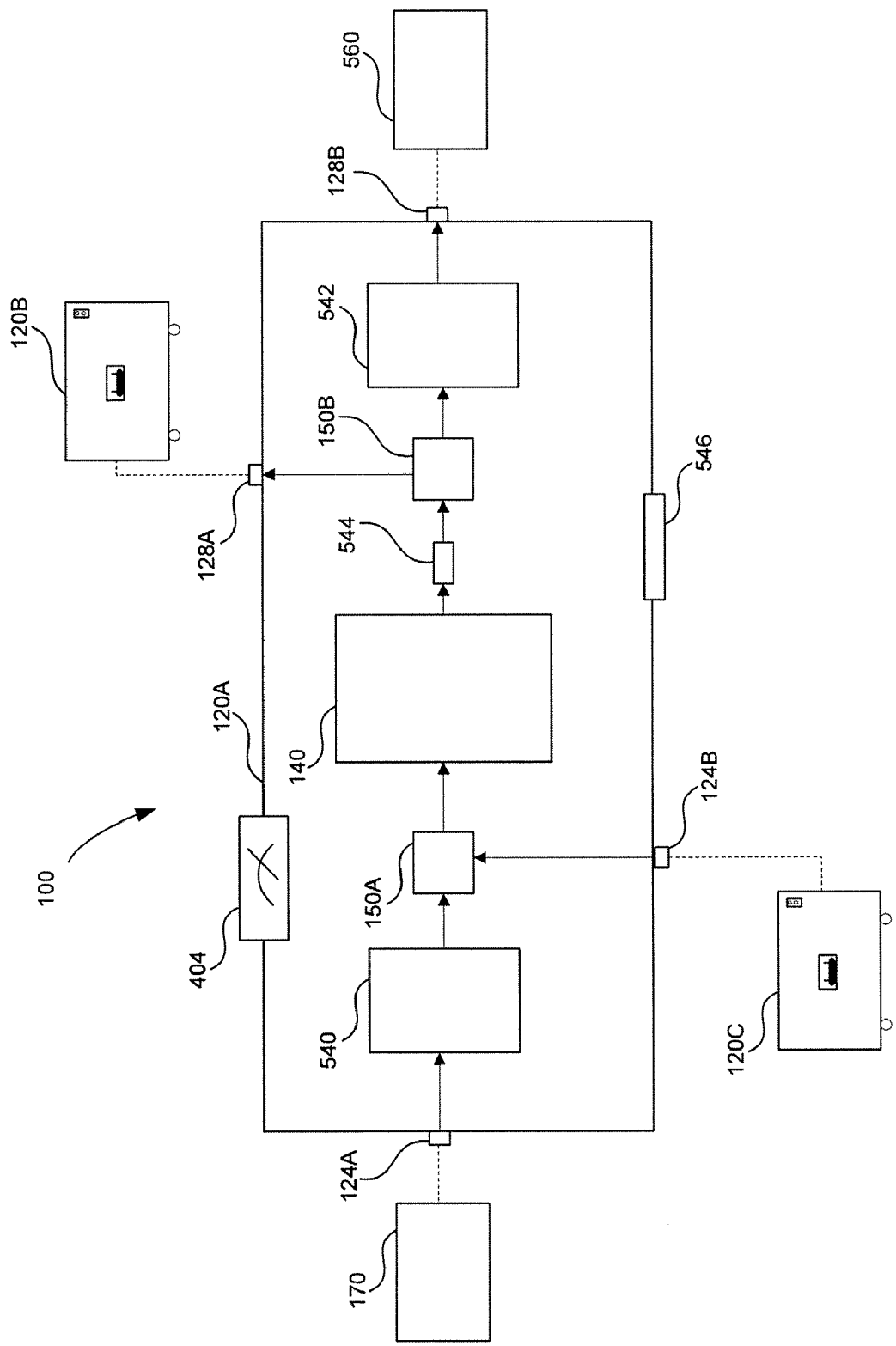
FIG. 5 shows a schematic of a power supply unit of an exemplary portable power supply system with additional electrical components.

In some embodiments, power supply units may include electrical devices to meet specific design needs. FIG. 5, for instance, shows a power supply unit 120A with an inverter 542 for converting direct current (DC) electrical energy to AC electrical energy. The AC electrical energy may be used to power a remotely-located AC load 560. The inverter 542 is connected between switching mechanism 150B and output destination 128B. A charge controller 540 may be included to regulate the amount of charging energy that energy storage device 140 receives from external power source 170. The charge controller 540 is connected between input source 124A and switching mechanism 150A. A fan 546 may be included to remove heat, or any out-gassing, generated within the power supply unit 120A. A fuse 544 may be included to limit the amount of electrical charge delivered by the energy storage device 140. The fuse 544 can be any type of circuit breaker and is connected between the energy storage device 140 and switching mechanism 150B.

Figure 6:
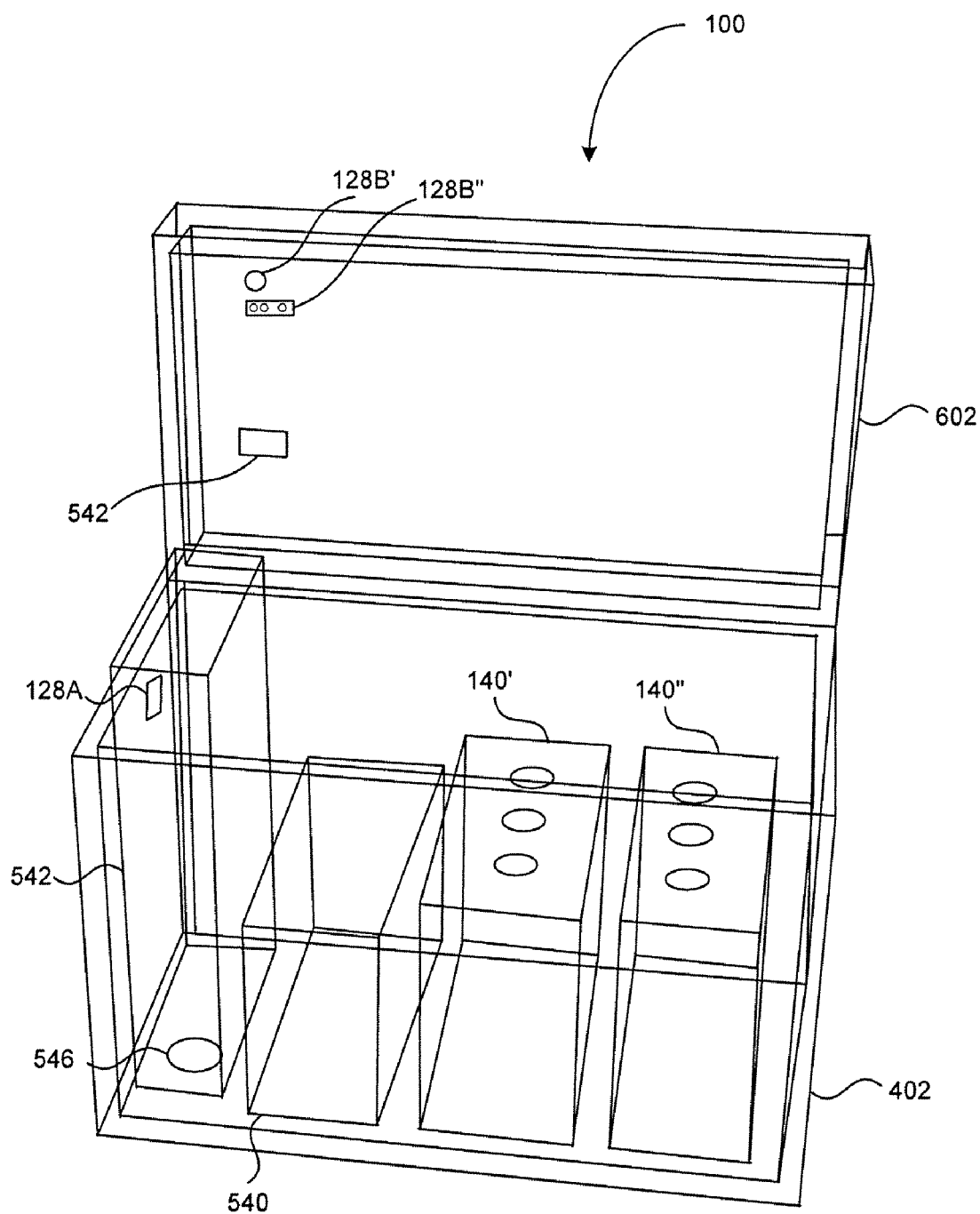
FIG. 6 depicts a power supply unit of an exemplary portable power supply system enclosed in a housing mechanism.

FIG. 6 illustrates how components of a portable power supply system 100 may be contained in a housing mechanism 402. In some embodiments, the housing mechanism 402 may include a lid 602 to allow for the addition or removal of components as necessary. FIG. 6 shows, for example, how a power supply unit 120 can include a plurality of energy storage devices 140' and 140". Rather than disconnecting a drained power supply unit 120 from a remotely-located load device, a discharged energy storage device 140' or 140" of the power supply unit 120 may be replaced with a charged energy storage device 140' or 140". This would allow a power supply unit 120 to power remotely-located load devices for extended periods without returning to a charging station.

Although the present invention has been described with reference to specific exemplary embodiments, it will be recognized that the invention is not limited to the embodiments described, but can be practiced with modification and alteration within the scope of the appended claims. Accordingly, the specification and drawings are to be regarded in an illustrative sense rather than a restrictive sense.

I claim:

1. A method for supplying cordless power from a portable power supply system, the method comprising:
   at a first power supply unit, sensing whether a second power supply unit is coupled to the first power supply unit;
      if the second power supply unit is sensed to be coupled to the first power supply unit, then receiving electrical energy at a first energy storage device, via a first switch, from the second power supply unit; whereas
      if the second power supply unit is sensed to not be coupled to the first power supply unit, then receiving electrical energy at the first energy storage device, via the first switch, from an input source; and
   at the first power supply unit, sensing whether a third power supply unit is coupled to the first power supply unit;
      if the third power supply unit is sensed to be coupled to the first power supply unit, then directing electrical energy from the first energy storage device, via a second switch, to the third power supply unit; whereas
      if the third power supply unit is sensed to not be coupled to the first power supply unit, then directing electrical energy from the first energy storage device, via the second switch, to an output destination.

2. A method for supplying cordless power from a portable power supply system as recited in claim 1, wherein the input source is configured to receive electrical energy from at least one of a solar energy source or an alternating current (AC) energy source.

3. A method for supplying cordless power from a portable power supply system as recited in claim 1, wherein the first energy storage device is one of, a battery, a capacitor, or a fuel cell.

4. A method for supplying cordless power from a portable power supply system as recited in claim 1, further comprising:
   converting the electrical charge directed by the first energy storage device to an alternating current (AC) power before directing the electrical energy to the output destination.

5. A method for supplying cordless power from a portable power supply system as recited in claim 1, further comprising:
   controlling the amount of electrical charge directed to the first energy storage via a charge controller.

6. A portable power supply system for providing cordless electric power, the portable power supply system comprising:
   a supply means for supplying electrical charge, wherein the supply means derives the electrical charge from one or more of a plurality of charge sources;
   a controlling means electrically coupled to the supply means, wherein the controlling means is for controlling the supply means and for directing the electrical charge derived by the supply means from one or more of the plurality of charge sources to the portable power system;
   an energy storing means for storing the electrical charge delivered by the charge controlling means, wherein the energy storing means is coupled to the charge controlling means using a first switching means, further wherein the first switching means enables the energy storing means to derive additional electrical charge from a second portable power system;
   a sensing means for determining whether the second portable power system is coupled to the first portable power system;
   a sensing means for determining whether a third portable power system is coupled to the first portable power system; and
   a switching means for supplying electrical energy from the energy storing means to the third portable power system or to an inverting means for converting electrical energy to an alternating electric current, wherein the inverting means is connected to an output destination.

* * * * *